United States Patent [19]
Krajewski et al.

[11] Patent Number: 6,038,911
[45] Date of Patent: Mar. 21, 2000

[54] ONE PIECE CORRUGATED ANTI-INTRUSION BARRIER AND METHOD

[75] Inventors: Paul Edward Krajewski, Sterling Heights; Ronald George Lanzi, Shelby Township; James Gregory Schroth, Troy, all of Mich.

[73] Assignee: General Motors Corporation, Detroit, Mich.

[21] Appl. No.: 09/253,365

[22] Filed: Feb. 22, 1999

Related U.S. Application Data

[62] Division of application No. 08/757,599, Nov. 29, 1996, Pat. No. 5,924,760.

[51] Int. Cl.⁷ ............................................. B21D 13/10
[52] U.S. Cl. ............................................. 72/379.2
[58] Field of Search .................................. 72/379.6

[56] References Cited

U.S. PATENT DOCUMENTS

| | | | |
|---|---|---|---|
| 1,462,475 | 7/1923 | Atkinson | 72/374 |
| 2,753,918 | 7/1956 | Bradfield | 72/379.6 |
| 4,306,381 | 12/1981 | Presto | 49/502 |
| 5,333,482 | 8/1994 | Dunlap et al. | 72/379.6 |
| 5,536,060 | 7/1996 | Rashid et al. | 296/146.6 |

FOREIGN PATENT DOCUMENTS

| | | | |
|---|---|---|---|
| 0057270A1 | 8/1982 | European Pat. Off. | |
| 4308035 A1 | 9/1994 | Germany. | |
| 56-50813 | 5/1981 | Japan. | |
| 62-1626 | 1/1987 | Japan. | |
| 3-45421 | 2/1991 | Japan. | |
| 277472 | 9/1927 | United Kingdom | 72/379.6 |
| 2152883 | 8/1985 | United Kingdom. | |
| 1189810 | 4/1970 | WIPO. | |

*Primary Examiner*—Lowell A. Larson
*Attorney, Agent, or Firm*—Lawrence B. Plant

[57] ABSTRACT

An anti-intrusion barrier comprising a corrugated metal sheet and at least one mounting flange integral with the sheet. The flange comprises extensions of the corrugations which have been collapsed inwardly upon themselves so as to provide a plurality of plateaus each defined by a pair of pleats formed by collapsed walls of the corrugations.

4 Claims, 3 Drawing Sheets

ONE PIECE CORRUGATED ANTI-INTRUSION BARRIER AND METHOD

This is a division of application Ser. No. 08/757,599 filed Nov. 29, 1996, now U.S. Pat. No. 5,924,760.

TECHNICAL FIELD

This invention relates to corrugated, vehicular, anti-intrusion barriers, and more particularly to a one-piece corrugated such barrier having at least one stiffened mounting flange formed integrally therewith, and a method of making same.

BACKGROUND OF THE INVENTION

Corrugated anti-intrusion barriers for protecting occupants from injury in vehicle crashes are well known in the art, and typically have their ends mounted to adjacent vehicle body components (e.g. door or the bulkhead between engine and passenger compartments). One such barrier is a door side impact beam shown in U.S. Pat. No. , Rashid et al. 5,536,060, issued Feb. 8, 1995 and assigned to the assignee of the present invention. Heretofore, discrete mounting flanges have either been formed separately and attached to the barrier panel, as by welding, or have been formed integrally with the barrier panel by superplastic forming techniques, both of which add to the cost and complexity of making the barriers.

SUMMARY OF THE INVENTION

The present invention contemplates a novel, corrugated, anti-intrusion barrier, and method of making same, which barrier is adapted for mounting to an adjacent component of a vehicle body via at least one (and preferably two) pleat-reinforced, mounting flange(s) formed integrally with, and from, the corrugated sheet that forms the barrier. More specifically, the barrier is a reinforcing panel comprising a corrugated metal sheet having a plurality of arcuate corrugations alternately extending in opposite directions from each other. The corrugations each have (1) an apex and (2) an arcuate wall extending from the apex and adjoining an arcuate wall of a next adjacent, oppositely-extending corrugation along a line which lies in a central plane of the sheet metal midway between the apices of the oppositely-extending corrugations. The arcuate wall has a curvature such that the tangent thereto at the line where the walls of adjacent oppositely-extending corrugations meet is normal to the central plane. The barrier includes at least one stiffened mounting flange (preferably two) which is integral with the panel at the ends thereof and is formed from the corrugated sheet that forms the panel. The mounting flange comprises extensions of the corrugations that form the reinforcing panel which have been collapsed inwardly upon themselves so as to provide a plurality of flattened corrugations each having a single-ply center plateau portion defined by a pair of stiffening pleats which are formed by folding the corrugation's arcuate walls under the single-ply center portion. The mounting flange may lie in substantially the same plane as the central plane of the reinforcing panel, or preferably, will extend at an angle (most preferably ca. 90 degrees) from the central plane for mounting to vehicle components which are oriented at a similar angle to such plane.

The anti-intrusion panel of the present invention is made by a novel method which comprises corrugating a metal sheet to provide a plurality of arcuate corrugations which alternately extend in opposite directions from each other. Each of the corrugations has an apex and an arcuate wall extending from the apex. The arcuate wall of one corrugation adjoins an arcuate wall of a next adjacent, opposite-extending corrugation along a line which lies in a central plane of the sheet metal midway between the apices of opposite-extending corrugations, and has a curvature such that the tangent thereto at the line where the opposite-extending corrugations meet is normal to the central plane. The corrugated sheet has at least one corrugated end portion. The sheet is clamped so as to substantially immobilize it while leaving the corrugated end portion exposed. An integral mounting flange is formed from the corrugated sheet by compressing/crimping the corrugated end portion in a direction normal to the central plane (between the apices of the oppositely-extending) corrugations so as to substantially completely collapse the corrugations thereat inwardly upon themselves and provide a plurality of flattened corrugations each having a substantially planar, single-ply, plateau portion lying in a plane proximate, and substantially parallel to, the central plane between the corrugations. The single-ply portion of the flattened corrugation is defined by a pair of stiffening pleats formed by folding the arcuate wall of the corrugation back under the single-ply portion as the corrugation is collapsed. Preferably, the lateral edges (i.e. parallel to the corrugations/pleats) of the corrugated end portion are confined during compressing so as to prevent lateral growth of the end portion and insure substantially uniform folding of the arcuate walls to provide folded segments of nearly equal length on either side of the line where adjacent walls meet. After compressing/crimping, the flange may remain in substantially the same plane as the central plane, or will preferably be bent so as to orient the flange in a plane that intersects (preferably at about 90 degrees) the central flange for mounting the panel to vehicle components similarly oriented.

BRIEF DESCRIPTION OF THE DRAWINGS

The invention will be better understood when considered in the light of the detailed description of a specific preferred embodiment thereof which is given hereafter in conjunction with the several drawings in which.

DESCRIPTION OF THE PREFERRED EMBODIMENT

Figure 1:
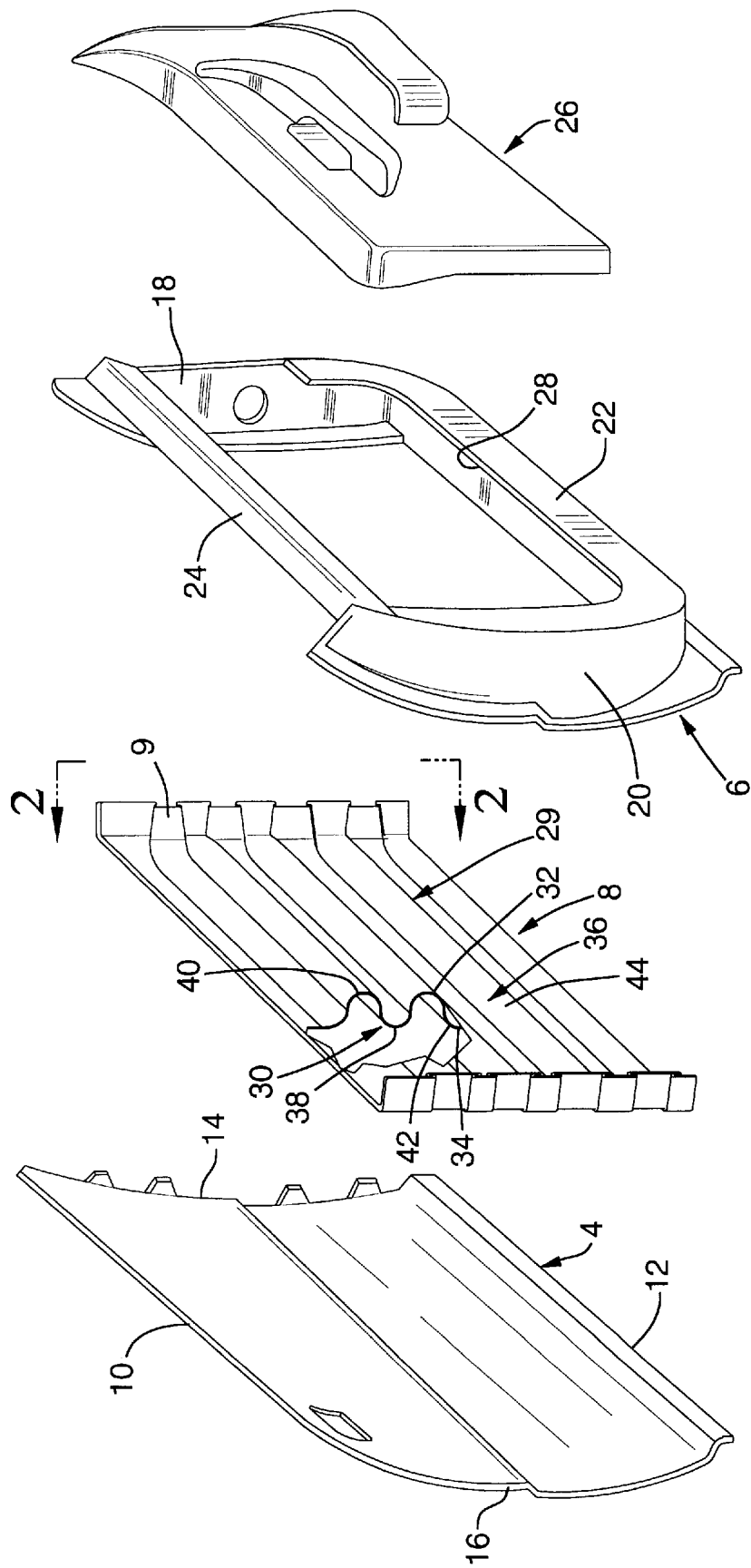
FIG. 1 is an exploded perspective view of a vehicle door including an anti-intrusion barrier in accordance with the present invention.

FIG. 1 depicts a vehicular door 2 comprising an outer panel 4, an inner panel 6, and an anti-intrusion barrier 8 in accordance with the present invention positioned between the outer and inner panels 4 and 6 respectively. Not shown, are such conventional door parts as hinges, a latch, a handle, a window, and window lift mechanism which would normally form part of the complete door assembly. The outer panel 4 is formed of a single sheet of material and includes an upper edge 10, a bottom edge 12, and front and rear edges 14 and 16 for securing to the inner panel 6. The inner panel 6 is stamped from a single sheet of metal and includes front and rear side portions 18 and 20 respectively, as well as bottom portion 22 and window sill support member 24 which connect the side portions 18, 20 together at the bottom and top of the door respectively. A removable decorative/trim panel 26 is adapted to be secured to the inner panel 6 and serves to provide interior vehicle decor while concealing the opening 28 in the inner panel 6, which opening 28 provides installation and maintenance access to the window operating and door latch mechanisms.

Figure 3:
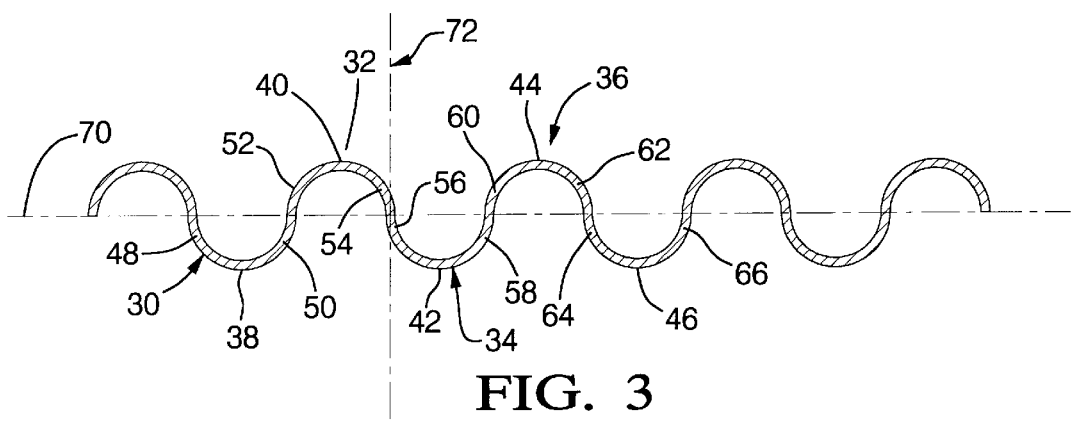
FIG. 3 is an end view of a metal sheet corrugated according to one embodiment of the present invention.
Figure 4:
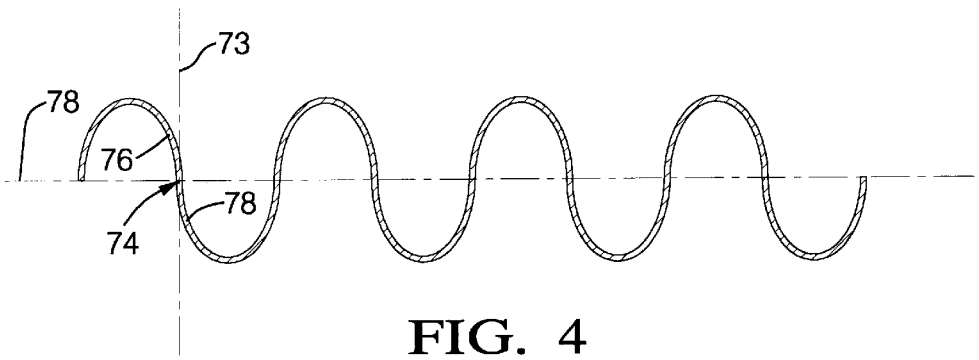
FIG. 4 is an end view of a metal sheet corrugated according to another embodiment of the present invention.
Figure 5:
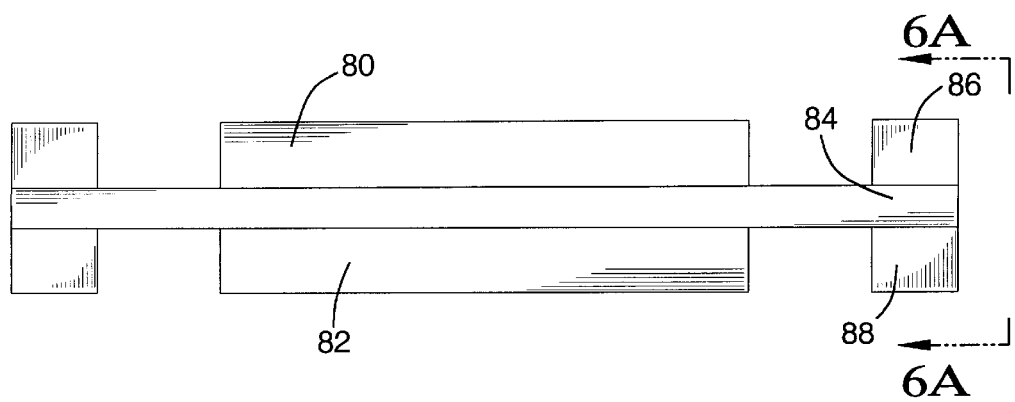
FIG. 5 is a side elevation view of a corrugated sheet clamped and ready for end flattening in accordance with the present invention.

The anti-intrusion barrier 8 is formed from a corrugated piece of sheet metal, preferably formed by stamping, and includes: (1) a reinforcement panel 28 comprising a plurality of alternately, oppositely-extending arcuate (i.e. here semicircular) corrugations 30, 32, 34 and 36, each having an apex 38, 40, 42 and 44 respectfully, and defined by a pair of arcuate walls 48–50, 52–54, 56–58, 60–62, and 64–66 respectively; and (2) a stiffened flange 9 integral therewith. In this regard, corrugations 32 and 36 are said to be "oppositely-extending" relative to corrugations 30 an 34. The arcuate wall (e.g. wall 50) of one corrugation (e.g. corrugation 30) adjoins an arcuate wall 52 of oppositely-extending corrugation 32 along a line 68 which lies in a central plane 70 which, in turn, lies midway between the apices 38, 40, 42, 44 and 46 of the oppositely extending corrugations 30, 32, 34, 36, etc. The line 68 extends into the plane of the two dimensional drawings, and accordingly only the end thereof is shown in the Figures. The curvature of the adjoining arcuate walls 50 and 52, et alia, is such that a tangent 72 thereto at the line 68 will be normal (i.e. perpendicular) to the central plane 70. This is necessary to insure that when the corrugations are subsequently collapsed in the formation of the stiffened mounting flanges, the walls will properly fold substantially evenly under the collapsing corrugations to form stiffening pleats as will be discussed hereinafter in the course of describing the process of the present invention. In the embodiment shown in FIG. 3, the corrugations are semi-circular in shape. FIG. 4 depicts another embodiment of the invention where the arcuate corrugations are elliptical in shape such that a tangent 73 to the arcuate walls 76 and 78 drawn at the line 74, where the arcuate walls 76 and 78 meet, will be normal to the center plane 78. The barrier panels are preferably made from aluminum (including alloys thereof), though other materials such as magnesium, steel, titanium, and the like may also be used.

Following corrugating, the sheet is clamped at its center by a pair of clamp halves 80 and 82 in order to immobilize the corrugated sheet. The clamp halves 80 and 82 will preferably interdigitate like the dies used to corrugate the sheet, but will be shorter than the length of the corrugated sheet so as to leave at least one (and preferably both) corrugated end portion 84 projecting outside the clamp. Alternatively, the clamp halves 80 and 82 may only engage the apices of the several corrugations to hold the corrugated sheet. A pair of compression platens 86 and 87 are positioned opposite each other on opposite sides of the corrugated end portion 84 and define a compression zone therebetween. The platens 86 and 87 are caused to squeeze and compress the end portion 84 therebetween to collapse the corrugations thereof. As best shown in FIGS. 6A–6D, the platens 86 and 87 are flanked by a pair of side plates 90 and 92 which serve to confine the corrugated end portion 84 to the compression zone between the platens so as to prevent the lateral edges 94 and 96 of the corrugated end portion 84 from moving laterally outwardly of the platens 86 and 88 during the collapsing of the end portion 84. This insures a more uniform folding of the corrugation walls to form the stiffening pleats.

Figure 6A:
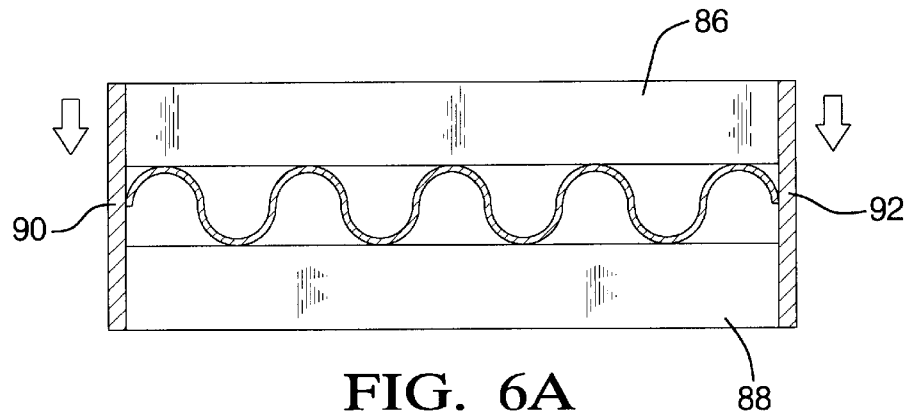
FIGS. 6A–D are views in the direction 6—6 of FIG. 5 depicting several stages of flattening of the end portion of a corrugated metal sheet in accordance with the present invention.
Figure 6B:
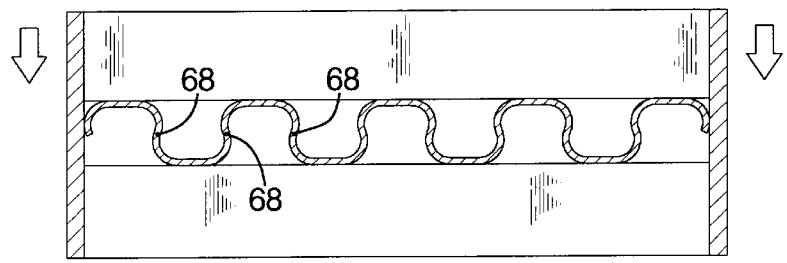
Figure 6C:
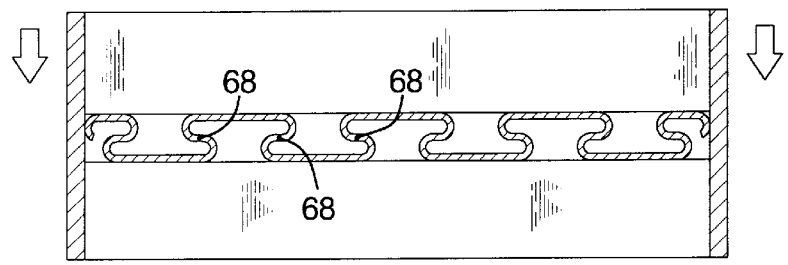
Figure 6D:
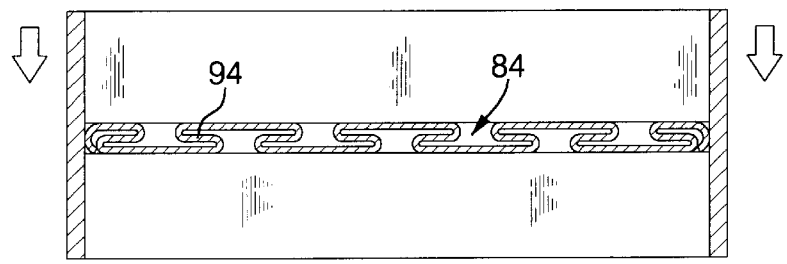

FIG. 6A depicts the corrugated end portion 84 just before closing of the platens 86 and 88 and squeezing of the end portion 84 commences. FIG. 6D, on the other hand, shows the platens 86 and 88 in a fully closed position, and the end portion 84 fully collapsed. FIGS. 6B and 6C show deformation of the corrugated end portion 84 at intermediate stages of the process. When the arcuate corrugations are so shaped that the tangent to the walls thereof at the center plane 70 is normal to such plane, the walls will fold evenly inwardly of their associated corrugation to form a 3-ply pleat 94 by effectively rotating about the line 68 where adjoining walls meet. As a result, the fully collapsed end portion 84 will comprise a plurality of collapsed corrugations in the form of a plurality of single-ply plateau portions 96, each defined by a pair of 3-ply pleats 94 formed from the walls of the corrugations which have been folded back under the plateau portions 96.

The flattened end portion 84 forms a pleated flange 9 for mounting the reinforcing panel 8 to other components of the vehicle. As best shown in FIG. 1, the flange 9 will preferably be bent so as to be oriented at an angle to the center plane of the reinforcing panel for attachment (e.g. by bolting, riveting, welding or the like) to similarly oriented vehicle components.

Figure 2:
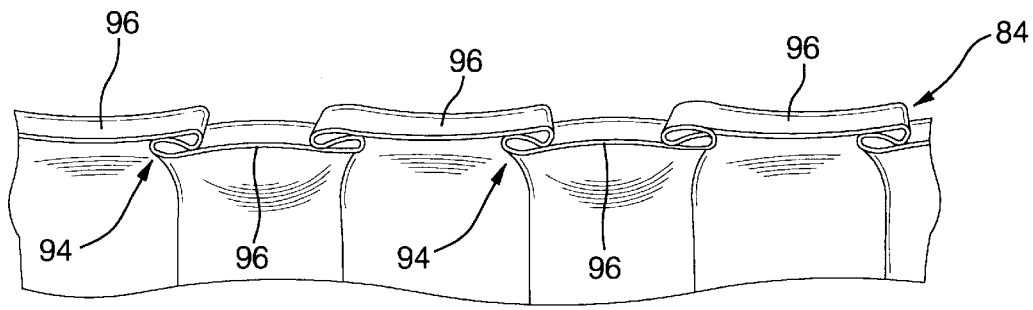
FIG. 2 is an end view of the anti-intrusion barrier taken in the direction 2—2 of FIG. 1.

Tests results conducted using 0.8 mm thick AA 6111 and AA 5754 aluminum alloys having semicircular corrugations (i.e. 1.9 cm diameter) yielded flattened flanges such as depicted in FIG. 2 where about 26% of the flange 9 comprised 3-ply stiffening pleats and the remainder single-ply plateau portions. In actual practice, much larger corrugations (e.g. about 9 cm in diameter) would most likely be used.

While the invention has been described in terms of a specific embodiment thereof, it is not intended to be limited thereto, but rather only to the extent set forth hereafter in the claims which follow.

What is claimed is:

1. A method of making an anti-intrusion barrier for attachment to a component of a vehicle body, comprising the steps of:

corrugating a metal sheet to provide a corrugated sheet having a plurality of arcuate corrugations which alternately extend in opposite directions from each other, said corrugations each having an apex and an arcuate wall extending from said apex, said arcuate wall adjoining an arcuate wall of a next adjacent opposite-extending corrugation along a line which lies in a central plane of said sheet metal midway between the apices of said corrugations, said arcuate wall having a curvature such that the tangent thereto at said line is normal to said central plane, said sheet having at least one corrugated end portion;

clamping said corrugated sheet so as to substantially immobilize said corrugated sheet; and forming an integral mounting flange on said corrugated sheet by compressing said corrugated end portion within a compression zone and in a direction normal to said central plane to substantially collapse the corrugations at said end inwardly upon themselves so as to provide a plurality of flattened corrugations each having a substantially planar plateau portion lying in a plane proximate to said central plane and defined by a pair of pleats each formed by folding a said wall back under said planar plateau portion as said corrugation is collapsed.

2. The process according to claim 1 wherein said corrugated end has a pair of lateral edges paralleling said corrugations, and including the step of confining said lateral edges to said compression zone to prevent lateral growth thereof during said compressing.

3. The process according to claim 1 including the step of bending said flange so as to orient said flange in a plane that intersects said central plane.

4. The process according to claim 3 wherein said bending is such as to orient said flange about 90 degrees from said central plane.

* * * * *